US007136067B2

(12) United States Patent
Stamm et al.

(10) Patent No.: US 7,136,067 B2
(45) Date of Patent: Nov. 14, 2006

(54) USING EXTERNALLY PARAMETERIZEABLE CONSTRAINTS IN A FONT-HINTING LANGUAGE TO SYNTHESIZE FONT VARIANTS

(75) Inventors: Beat Stamm, Redmond, WA (US); Gregory C. Hitchcock, Woodinville, WA (US); Michael J. Duggan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 176 days.

(21) Appl. No.: 10/764,745

(22) Filed: Jan. 26, 2004

(65) Prior Publication Data

US 2005/0162430 A1 Jul. 28, 2005

(51) Int. Cl.
*G06T 11/00* (2006.01)
*G09G 5/24* (2006.01)

(52) U.S. Cl. ...................... 345/471; 345/468; 345/469; 345/467

(58) Field of Classification Search ...... 345/467–472.3
See application file for complete search history.

(56) References Cited

U.S. PATENT DOCUMENTS

| | | | | | |
|---|---|---|---|---|---|
| 4,387,622 | A | | 6/1983 | Deutsch | 84/1.22 |
| 4,696,707 | A | | 9/1987 | Lewis et al. | 156/64 |
| 4,884,225 | A | | 11/1989 | Fogarty et al. | 364/559 |
| 5,155,805 | A | | 10/1992 | Kaasila | 395/151 |
| 5,159,668 | A | | 10/1992 | Kaasila | 395/151 |
| 5,319,358 | A | | 6/1994 | Martinez et al. | 345/141 |
| 5,325,479 | A | | 6/1994 | Kaasila | 395/151 |
| 5,412,770 | A | | 5/1995 | Yamashita et al. | 395/142 |
| 5,465,323 | A | | 11/1995 | Mallet | 395/123 |
| 5,500,927 | A | | 3/1996 | Sander-Cederlof et al. | 395/133 |
| 5,539,841 | A | | 7/1996 | Huttenlocher et al. | 382/218 |
| 5,586,241 | A | * | 12/1996 | Bauermeister et al. | 345/467 |
| 5,715,473 | A | * | 2/1998 | Reed | 715/542 |
| 5,751,289 | A | | 5/1998 | Myers | 345/419 |
| 5,754,873 | A | * | 5/1998 | Nolan | 715/527 |
| 5,760,787 | A | | 6/1998 | Piper | 345/442 |

(Continued)

FOREIGN PATENT DOCUMENTS

WO WO 9836630 A2 * 8/1998

OTHER PUBLICATIONS

Garcia, Dan. Discussion Section 3 Scan Conversion Distillation. Published approximately Spring-Fall 1998, as per section 0 of the discussion. Relied on only for definition. Pertinant pp. 1 and 2.*

(Continued)

*Primary Examiner*—Ulka Chauhan
*Assistant Examiner*—Eric Woods
(74) *Attorney, Agent, or Firm*—Workman Nydegger

(57) ABSTRACT

The principles of the present invention relate to using externally parameterizeable constraints in a font-hinting language to synthesize font variants. A computing system accesses a scaled font that has been scaled for rendering at a target size and a target resolution. The scaled font includes hints that constrain how glyphs of the scaled font are to be rendered at the target size and target resolution. The computing system accesses one or more external font parameters that alter how the glyphs of the scaled font are to be rendered. The computing system applies the one or more external font parameters to the scaled font to synthesize a font variant such that hints from the scaled font are preserved in the font variant. The computing system can render glyphs of the font variant that comply with the one or more external font parameters and the hints.

24 Claims, 4 Drawing Sheets

U.S. PATENT DOCUMENTS

| | | | | |
|---|---|---|---|---|
| 5,777,627 | A | 7/1998 | Takazawa | 345/469 |
| 5,781,714 | A | 7/1998 | Collins et al. | 395/171 |
| 5,805,832 | A | 9/1998 | Brown et al. | 395/752 |
| 5,854,855 | A | 12/1998 | Errico et al. | 382/187 |
| 5,898,439 | A | 4/1999 | Takazawa | 345/441 |
| 5,949,435 | A | 9/1999 | Brock et al. | 345/468 |
| 6,037,949 | A | 3/2000 | DeRose et al. | 345/430 |
| 6,048,116 | A | 4/2000 | Kumada | 400/76 |
| 6,088,041 | A | 7/2000 | Ballard et al. | 345/467 |
| 6,249,908 | B1 | 6/2001 | Stamm | 717/5 |
| 6,253,374 | B1 | 6/2001 | Dresevic et al. | 717/11 |
| 6,289,488 | B1 | 9/2001 | Dave et al. | 716/1 |
| 6,300,960 | B1 | 10/2001 | DeRose et al. | 345/474 |
| 6,363,405 | B1 | 3/2002 | Loginov | 708/270 |
| 6,373,489 | B1 | 4/2002 | Lu et al. | 345/428 |
| 6,441,846 | B1 | 8/2002 | Carlbon et al. | 348/169 |
| 6,452,597 | B1 | 9/2002 | Goldberg et al. | 345/472 |
| 6,456,305 | B1 * | 9/2002 | Qureshi et al. | 715/800 |
| 6,529,197 | B1 | 3/2003 | Ballard et al. | 346/468 |
| 6,600,485 | B1 | 7/2003 | Yoshida et al. | 345/419 |
| 6,600,490 | B1 | 7/2003 | Brock et al. | 345/472 |
| 6,714,679 | B1 | 3/2004 | Scola et al. | 382/199 |
| 6,760,028 | B1 | 7/2004 | Salesin et al. | 345/469 |
| 6,778,698 | B1 | 8/2004 | Prakash et al. | 382/164 |
| 6,803,913 | B1 | 10/2004 | Fushiki et al. | 345/467 |
| 6,826,480 | B1 | 11/2004 | Picone et al. | 702/3 |
| 6,992,671 | B1 | 1/2006 | Corona | 345/467 |
| 2001/0002131 | A1 | 5/2001 | DeRose et al. | |
| 2001/0032029 | A1 | 10/2001 | Kauffman | 700/99 |
| 2003/0208473 | A1 | 11/2003 | Lennon | 707/3 |
| 2004/0109592 | A1 | 6/2004 | Bankman et al. | 382/128 |
| 2004/0160444 | A1 | 8/2004 | Salesin et al. | 345/471 |
| 2005/0005261 | A1 | 1/2005 | Severin | 717/108 |
| 2005/0100214 | A1 | 5/2005 | Zhang et al. | 382/179 |

OTHER PUBLICATIONS

Image Processing: Algorithms and Systems II Interpolation of Images Containing Text for Digital Displays Riccardo Di Federico, Mario Raffin, Paola Carrai, Giovanni Ramponi 2003 pp. 42-53.

U.S. Appl. No. 10/764,961, filed Jan. 26, 2004, Beat Stamm, et al.

U.S. Appl. No. 10/764,787, filed Jan. 26, 2004, Beat Stamm, et al.

U.S. Appl. No. 10/764,622, filed Jan. 26, 2004, Beat Stamm, et al.

Klassen, Victor R. and Janamanchi, Kalpana. *Resolution and Bit Depth: How Much is Enought?*, Human Vision and Electronic Imaging V, Jan. 2000, pp. 28-36.

Shamir, Ariel and Rappoport, Ari. *Extraction of Typographic Elements from Outline Representations of Fonts*, Computer Graphics Forum, 1996.

Weisstein, Eric W. *Taylor Series*. From MathWorld—A Wolfram Web Resource. 1999.

Foley, James et al. *Computer Graphics: Principles and Practice.2nd Edition in C*: Addison-Wesley Publishing Company, New York, 1996. various pages.

*Designing Multiple Master Typefaces*. Adobe Systems Incorporated. 1995, 1997.

*Type 1 Font Format Supplement*. Adobe Developer Support, Technical Specification #5015. Adobe Systems Incorporated, May 15, 1994.

* cited by examiner

Fig. 3A

| | | |
|---|---|---|
| The quick brown fox jumps over the lazy dog. | +5% | Expanded Advance Widths 301 |
| The quick brown fox jumps over the lazy dog. | +4% | |
| The quick brown fox jumps over the lazy dog. | +3% | |
| The quick brown fox jumps over the lazy dog. | +2% | |
| The quick brown fox jumps over the lazy dog. | +1% | |
| The quick brown fox jumps over the lazy dog. | 0 | Unaltered Scaled Font 306 |
| The quick brown fox jumps over the lazy dog. | -1% | Compressed Advance Widths 302 |
| The quick brown fox jumps over the lazy dog. | -2% | |
| The quick brown fox jumps over the lazy dog. | -3% | |
| The quick brown fox jumps over the lazy dog. | -4% | |
| The quick brown fox jumps over the lazy dog. | -5% | |

Arial

Fig. 3B

| | | |
|---|---|---|
| The quick brown fox jumps over the lazy dog. | +5% | Expanded Advance Widths 303 |
| The quick brown fox jumps over the lazy dog. | +4% | |
| The quick brown fox jumps over the lazy dog. | +3% | |
| The quick brown fox jumps over the lazy dog. | +2% | |
| The quick brown fox jumps over the lazy dog. | +1% | |
| The quick brown fox jumps over the lazy dog. | 0 | Unaltered Scaled Font 308 |
| The quick brown fox jumps over the lazy dog. | -1% | Compressed Advance Widths 304 |
| The quick brown fox jumps over the lazy dog. | -2% | |
| The quick brown fox jumps over the lazy dog. | -3% | |
| The quick brown fox jumps over the lazy dog. | -4% | |
| The quick brown fox jumps over the lazy dog. | -5% | |

Palatino

USING EXTERNALLY PARAMETERIZEABLE CONSTRAINTS IN A FONT-HINTING LANGUAGE TO SYNTHESIZE FONT VARIANTS

BACKGROUND OF THE INVENTION

1. The Field of the Invention

The present invention relates to manipulating data used to generate graphical objects. More specifically, the present invention relates to using externally parameterizeable constraints in a font-hinting language to synthesize font variants.

2. Background and Related Art

Computing technology has transformed the way we work and play. Computing systems now take a wide variety of forms including desktop computers, laptop computers, tablet PCs, Personal Digital Assistants (PDAs), and the like. Even household devices (such as refrigerators, ovens, sewing machines, security systems, and the like) have varying levels of processing capability and thus may be considered computing systems. As time moves forward, processing capability may be incorporated into a number of devices that traditionally did not have processing capability. Accordingly, the diversity of computing systems may likely increase.

Almost all computing systems that interface with human beings use a display to convey information. In many cases, the appeal of the display is considered an important attribute of the computing system. Display of textual information (e.g., Latin-based characters) typically includes processing glyphs that represent characters of a font. A glyph includes control points and instructions for connecting the control points such that an outline of a corresponding character can be generated in an arbitrary grid space (e.g., a pixel grid). Often, characters will be defined for display at a larger size and higher resolution and then mathematically scaled down (or otherwise manipulated) when the characters are to be rendered at smaller sizes and lower resolutions (or as bold, italic, etc.). Thus, a reduced number of descriptions, and potentially only one description, for a character (per font) need be stored.

To scale a character down the location of control points can be divided by a scaling factor. For example, to scale a character down by a scaling factor of 10, the coordinates of each control point defining the character (at the higher resolution) can be divided by 10. It may be that control points defining a character for display on a 100×100 grid are to be scaled down for display on a 10×10 grid. Thus, a control point at grid position (50, 30) can be scaled down to a control point at grid position (5, 3), a control point at grid position (70, 70) can be scaled down to a control point at grid position (7, 7), etc. Accordingly, a smaller outline representing the character may be calculated and there is a reduced need for storing a number of different sizes of bit-maps for the character.

The smaller outline can then be analyzed to identify grid locations that are to be turned on and to identify grid locations that are to be turned off (a process often referred to as "scan conversion"). One scan conversion algorithm determines if the center of a grid position is inside or outside the smaller outline. When the center of a grid position is inside the smaller outline the grid position is turned on. On the other hand, when the center of a grid position is outside the smaller outline the grid position is turned off.

However, at times, and especially at lower resolutions, the results of scan conversion produce an unacceptable representation of a character. Unacceptable character representations can result from rounding errors in the scaling down process. Further, rounding errors have a greater affect on character representation when a single grid location (e.g., a pixel) is on scale with the features of a character. For example, a rounding error that causes one grid location to be inappropriately turned on (or turned off) on a 50×50 grid may not even be detectable by the human eye. However, a rounding error that causes one grid location to be inappropriately turned on (or turned off) on a 4×4 grid may result in a character that is perceived as unacceptable to the human eye. At lower resolutions scan conversion can even fail to preserve the topology of the original outline of the character, resulting in disconnected grid locations.

To compensate for the sometimes inappropriate results of scan conversion, character outlines can be supplemented with constraints (often referred to as "hints") that assist in identifying whether grid locations are to be turned on or turned off when a character is rendered. The highest quality hinting is typically a manual process performed by a typographer. The typographer views a character at various sizes and supplements a higher resolution outline of the character with computer-executable instructions that indicate how to render the character at lower resolutions. When the character is to be rendered, a computing system processes the computer-executable instructions and renders the character in accordance with the hints implemented in the computer-executable instructions. For example, a hint can indicate that a number of characters of a font are to be rendered at the same height.

More formally, a hint can be expressed as an algorithm defining one or more dependent parameters in terms of one or more independent parameters. Hints for one control point can be expressed in terms of the location of other control points or locations on a grid (e.g., a capitalization line). For example, the position of a control point "P" can be expressed in terms of the position of a control point "Q" such that P is a fixed distance "c" from Q (e.g., in a vertical or horizontal direction). That is, P=Q+c. Thus, when Q is moved, a corresponding move of P may be required so that P conforms to the fixed distance c.

Similarly, the position of the control point P may be expressed in terms of the position of two other control points "$Q_1$" and "$Q_2$," along with a number "$\alpha$" to indicate the degree of blending of the positions of the two control points "$Q_1$" and "$Q_2$." The position of the control point "P" is assigned the expression "$(1-\alpha)\cdot Q_1+\alpha\cdot Q_2$." That is, $P=(1\alpha)\cdot Q_1+\alpha\cdot Q_2$. Thus, when $Q_1$ or $Q_2$ is moved, a corresponding move of P may be required so that P conforms to the constraint.

Due in part to the wide variety of different artistic and technical features in different fonts, hints can be tailored to an individual font. Often, constraints are expressed in terms of a font-hinting language (e.g., the TrueType® language) having a limited and highly specific vocabulary. The limited and highly specific vocabulary simplifies the translation of the mathematical concepts into the font-hinting language. However, the limited and highly specific vocabulary can also limit the types of the constraints that can be expressed.

Fonts are typically stored in font files at a computing system where the characters of the fonts will be rendered. Applications, such as, for example, word processors and electronic mail clients, provide an interface for selecting fonts from among those fonts available at a computing system. Many applications also provide an interface for selecting the size of a selected font (e.g., 12 point, 8 point, etc.) and selecting font variants for the selected font (e.g., bold, italicized, subscript, superscript, small caps, etc.). Based on the selected font size, selected font variant, and resolution of the output device, a scaling module and hint processor can interoperate to generate an appropriate outline for rendering characters of a font. For example, a scaling module and hint processor can interoperate to generate appropriate outlines of bold 10 point characters at 96 dots per inch ("dpi").

Due to the wide range of font variants, constraints for some font variants are not necessarily appropriate for other font variants. Accordingly, there may be a number of font files for a font, each font file corresponding to one or more font variants. For example, there may be separate font files for Arial normal and bold characters, Arial superscript characters, and Arial small caps characters.

Unfortunately, most applications that allow font variant selection do not necessarily check to determine that all appropriate font files are accessible. That is, an application may provide an interface for selecting a subscript font variant even when the application lacks access to a corresponding subscript font file. Further, users expect a number of font variants to be available irrespective of the availability of corresponding supplemental font files and are often not even aware that each font variant may require a supplemental font file. As a result, applications can have a default algorithm that selects a similar font file when a font variant is to be rendered. For example, when lacking access to an Arial subscript font file, an application may simply select an Arial normal font file. However, since the normal font file is not hinted for rendering subscript characters, pixelation or other visual deficiencies may result.

Some mechanisms attempt to compensate for visual deficiencies that can result from using a mismatched font file to render a font variant. However, these mechanisms typically result in characters that no longer comply with hints included in the font file. Since hints are an important part of high quality font rendering, it may be difficult to appropriately render font variants, especially at small type sizes and on low resolution. Therefore, what would be advantageous are mechanisms for generating a font variant that complies with hints of the font used to generate the font variant.

BRIEF SUMMARY OF THE INVENTION

The foregoing problems with the prior state of the art are overcome by the principles of the present invention, which are directed towards using externally parameterizeable constraints in a font-hinting language to synthesize font variants. A computing system accesses a scaled font that has been scaled for rendering at a target size and a target resolution. The scaled font includes hints that constrain how glyphs of the scaled font are to be rendered at the target size and target resolution. The computing system accesses one or more external font parameters that alter how the glyphs of the scaled font are to be rendered. The computing system applies the one or more external font parameters to the scaled font to synthesize a font variant such that hints from the scaled font are preserved in the font variant. The computing system renders glyphs of the font variant that comply with the one or more external font parameters and the hints.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates a first example of synthesized font variants.

FIG. 3B illustrates a second example of synthesized font variants.

DETAILED DESCRIPTION OF THE PREFERRED EMBODIMENTS

Figure 1:
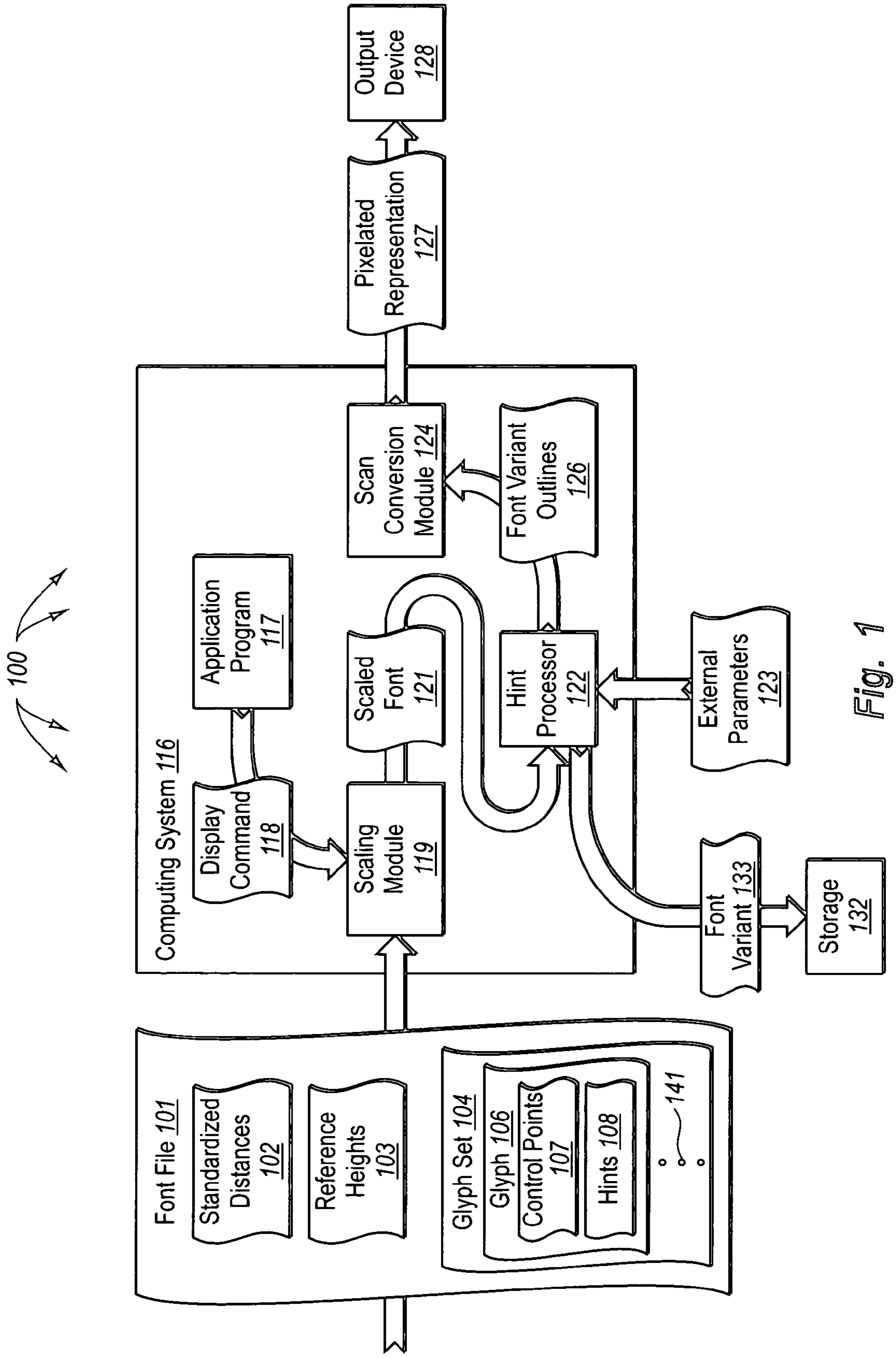
FIG. 1 illustrates an example computer architecture for using externally parameterizeable constraints in a font-hinting language to synthesize a font variant.

The principles of the present invention relate to systems, methods, and computer program products for using externally parameterizeable constraints in a font-hinting language to synthesize font variants. A computing system accesses a scaled font that has been scaled for rendering at a target size and a target resolution. The scaled font includes hints that constrain how glyphs of the scaled font are to be rendered at the target size and target resolution. The computing system accesses one or more external font parameters that alter how the glyphs of the scaled font are to be rendered. The computing system applies the one or more external font parameters to the scaled font to synthesize a font variant such that hints from the scaled font are preserved in the font variant. The computing system renders glyphs of the font variant that comply with the one or more external font parameters and the hints.

Embodiments within the scope of the present invention include computer-readable media for carrying or having computer-executable instructions or data structures stored thereon. Such computer-readable media may be any available media, which is accessible by a general-purpose or special-purpose computing system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computing system.

In this description and in the following claims, a "network" is defined as one or more data links that enable the transport of electronic data between computing systems and/or modules. When information is transferred or provided over a network or another communications connection (either hardwired, wireless, or a combination of hardwired or wireless) to a computing system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computing system or special-purpose computing system to perform a certain function or group of functions. The computer executable instructions may be, for example, binaries, intermediate format instructions such as assembly language, or even source code.

In this description and in the following claims, a "computing system" is defined as one or more software modules, one or more hardware modules, or combinations thereof, that work together to perform operations on electronic data. For example, the definition of computing system includes the hardware components of a personal computer, as well as software modules, such as the operating system of the personal computer. The physical layout of the modules is not important. A computing system may include one or more computers coupled via a network. Likewise, a computing system may include a single physical device (such as a mobile phone or Personal Digital Assistant "PDA") where internal modules (such as a memory and processor) work together to perform operations on electronic data.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Those skilled in the art will appreciate that the invention may be practiced in network computing environments with many types of computing system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of computer architecture 100 for using externally parameterizeable constraints in a font-hinting language to synthesize a font variant. Generally, in response to a command (e.g., display command 118) from an application program (e.g., application program 117), computing system 116 can cause graphical objects, such as, for example, text, to be rendered at output device 128. For example, in response to a selection of the Arial font and 6 point size, a word processor can subsequently render text using the Arial font at 6 point size.

Font file 101 (e.g., stored at or network accessible to computing system 116) contains standardized distances 102 (e.g., stroke weight, distance between glyphs, etc), reference heights 103 (e.g., capitalization line, subscript line, etc.), and glyph set 104. Glyph set 104 (e.g., a character set) can contain a plurality of glyphs (e.g., representing characters). While only glyph 106 is expressly depicted, vertical ellipsis 141 represents that other glyphs, in addition to glyph 106, can be included in glyph set 104. Each glyph in glyph set 104 can be associated with corresponding control points and hints for appropriately rendering the glyph. For example, control points 107 and hints 108 can be utilized to appropriately render glyph 106.

Hints can be computer-executable instructions of a font-hinting language, such as, for example, TrueType®, representing constraints on glyph set 104. Some constraints can constrain each of the glyphs in glyph set 104. For example, standardized distances 102 and reference heights 103 can include font-hinting language instructions for constraining each glyph in glyph set 104 (e.g., to the same capitalization line or horizontal distance from other glyphs). Other constraints can be specific to a particular glyph. For example, hints 108 can include font-hinting language instructions for constraining glyph 106 (e.g., constraints on the diagonal edges of a "Z").

It may be that a font file contains control points for rendering glyphs at a larger size. For example, font file 101 may contain control points and hints for glyphs that are to be rendered at 72 point (at a specified resolution). Accordingly, when a font and font size are selected (e.g., as indicated by display command 118), scaling module 119 can access font file 101 and scale down (or scale up) glyph set 104 for rendering at the selected font size (e.g, 12 point at the specified resolution or even at a different resolution). Scaling module 119 can output scaled font 121 that may contain scaled down glyphs that correspond to glyph set 104. Scaled font 121 can also include hints 108, which persist after glyph set 104 is scaled down. Based in part on a selected font size, resolution, and possibly other parameters, such as, for example, zooming factor, scaling module 119 can vary the magnitude of the scaling.

To scale down a glyph, the location of corresponding control points can be divided by a scaling factor. For example, to render a glyph one-tenth the size represented in a font file, the coordinates of each control point representing the glyph (at a larger size) can be divided by 10. It may be that control points defining a character for display on a 100×100 grid are to be scaled down for display on a 10×10 grid. Thus, a control point at grid position (50, 30) can be scaled down to a control point at grid position (5, 3), a control point at grid position (70, 70) can be scaled down to a control point at grid position (7, 7), etc. Accordingly, smaller outlines for glyphs can be calculated.

When scaling down for rendering at color display devices, control point locations may be calculated with additional precision. For example, pixels on some color computer monitors can include distinct red, green, and blue sub-components, or "sub-pixels." Sub-pixels can be individually addressed such that a control point can be determined at least down to the precision of a sub-pixel, for example, $\frac{1}{3}^{rd}$ of a pixel. It may also be that varying the intensity of a sub-pixel can cause the sub-pixel to be perceived as thicker or thinner, potentially resulting in a perceived additional increase in precision. Accordingly, a scaled down control point location can include a sub-pixel address as well as an intensity value (e.g., in a range from 0 to 255) indicating the intensity of the addressed sub-pixel.

Hint processor 122 can process hints (instructions of a font-hinting language) to cause a more appropriate rendering of glyphs (e.g., at smaller sizes). Some hints can be included in scaled fonts. For example, scaled font 121 can include font-hinting language instructions representing standardized distances 102, reference heights 103, and hints corresponding to individual glyphs (e.g., hints 108) as appropriate. Other hints can be included in external parameters. For example, external parameters 123 can include font-hinting language instructions representing constraints for generating a font variant. Hint processor 122 can process external parameters and alter scaled down glyphs in accordance with the received external parameters.

Hints, whether received in a scaled down font or received as external parameters, can be represented using the same font-hinting language. Thus, there is an increased likelihood that hints of a scaled font can be preserved when applying external parameters. For example, when applying external parameters 123 to scaled font 121, hint processor 122 has an increased likelihood of being able to preserve hints included in scaled font 121. Accordingly, font variants that better comply with existing constraints can be generated.

Hint processor 122 can output font variant outlines (e.g., font variant outlines 126) that can be processed to render a font variant. Hint processor 122 can also cache a font variant (e.g., font variant 133) for subsequent use (e.g., in storage 133). Thus, if the font variant is subsequently requested (e.g., in response to an application program command) the font variant can be rendered more efficiently.

Scan conversion module 124 can receive font variant outlines 126 and analyze font variant outlines 126 to identify grid locations (e.g., pixels, sub-pixels, or virtual pixels) that are to be turned on and to identify grid locations that are to be turned off (a process which may be referred to as "scan conversion"). Scan conversion module 124 can output pixelated representation 127 of one or more glyphs of the font variant. Output device 128 can receive pixelated representation 127 and render it accordingly. Output device 128 can be a monochrome or color output device, such as, for example, a display or printer.

Figure 2:
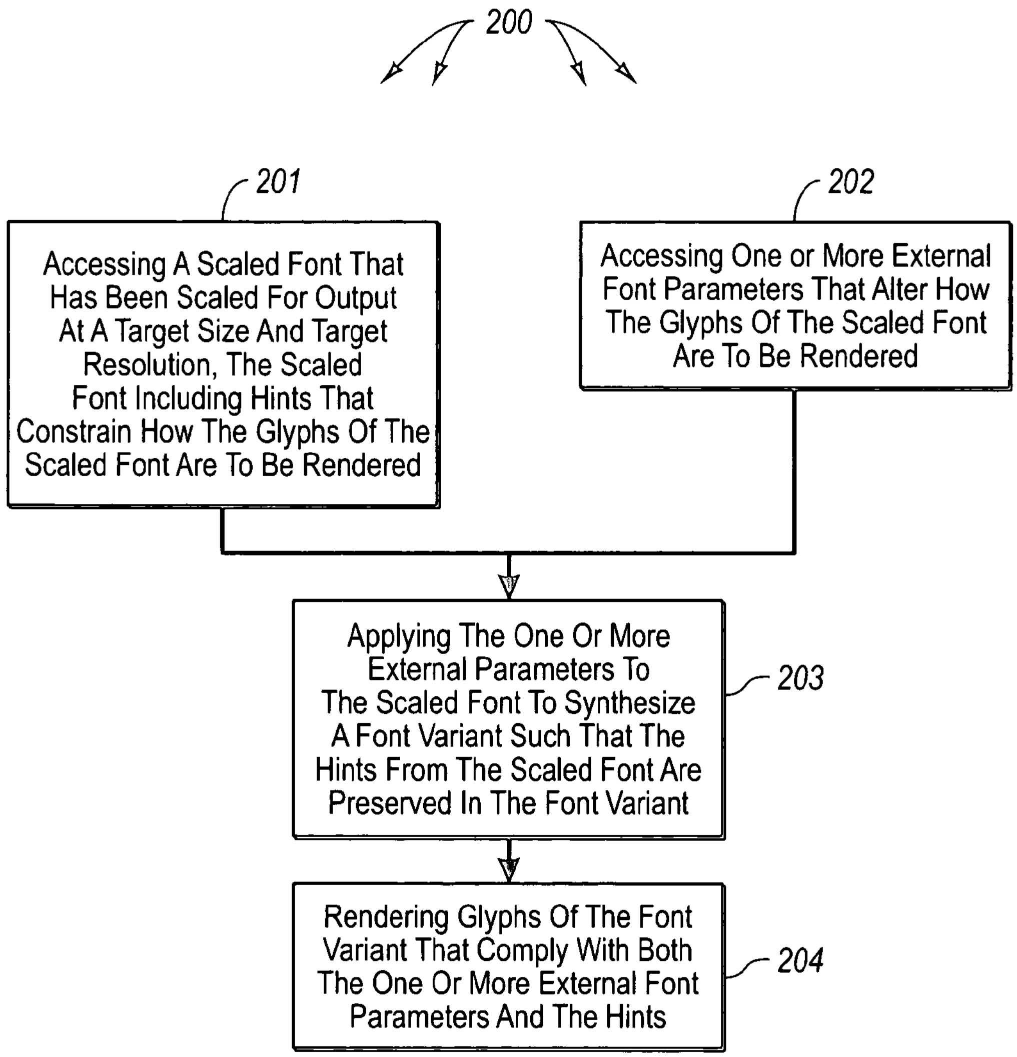
FIG. 2 illustrates a flowchart of an example method for using externally parameterizeable constraints in a font-hinting language to synthesize a font variant.

FIG. 2 illustrates a flowchart of an example method 200 for using externally parameterizeable constraints in a font-hinting language to synthesize a font variant. Method 200 will be described with respect to the computing system, modules, and data depicted in computer architecture 100. Method 200 includes an act of a computing system accessing a scaled font that has been scaled for rendering at a target size and a target resolution (act 201). For example, hint processor 122 can access scaled font 121.

A target size can be a font size, such as, for example, 4 point, 6 point, etc. A target resolution can be some number of dots per inch ("dpi"), such as, for example, 96 dpi or 600 dpi. The target size and target resolution can be for rendering the scaled font at a display device or printer. Thus, for example, a scaled font may be for rendering 12 point Arial font at 300 dpi at a monochrome printer.

An accessed scaled font can include hints that constrain how glyphs of the scaled font are to be rendered at the target size and target resolution. For example, scaled font 121 can include hints representing standardized distances 102 and reference heights 103 as well as other hints corresponding to particular glyphs (e.g., hints 108). As previously described, hints can be instructions of a font-hinting language.

The method 200 includes an act of the computing system accessing one or more external font parameters that alter how the glyphs of the scaled font are to be rendered (act 202). For example, hint processor 122 can access external parameters 123. External parameters 123 can be font-hinting language instructions for generating a font variant of scaled font 121.

External parameters can represent one or more of a plurality of font variations, such as, for example, expanding glyph size, compressing glyph size, expanding stroke weight, compressing stroke weight, and moving the position of glyphs (offsets). When glyphs are to be rendered on a two-dimensional grid, external parameters can represent expansion, compression, and/or movement in a horizontal direction (e.g., positive or negative X direction) and/or a vertical direction (e.g., positive or negative Y direction). For example, external parameters 123 can represent that glyphs of scaled font 121 are to be offset in a negative vertical direction such that the glyphs can be rendered as subscripts. External parameters including both horizontal and vertical components can represent corresponding diagonal expansion, compression, or movement.

One type of compression/expansion can be referred to as "positional compression/expansion". Positional compression/expansion is applicable to the positioning of the essential typographic features of a graphical object, such as, for example, strokes and serifs. For example, positional compression in a horizontal direction can move the vertical strokes of a lowercase letter "m" closer together, without making these vertical strokes any thinner. Positional compression can be particularly advantageous for implementing micro justification. For example, when text is being justified and a (hyphenated part of a) word would almost fit on a line (within the margins of justification), the text can be compressed by an essentially unnoticeable amount so that the text can be fit on the line.

On the other hand, positional expansion in a horizontal direction can move the strokes of the letter "m" further apart, without making the strokes any thicker. Positional expansion can also be particularly advantageous for implementing micro justification. For example, when the "blanks" between individual words appear too large, and when no other means of reducing these gaps are applicable to nicely fit a line of text between the margins of justification, then all the words can be expanded by an essentially unnoticeable amount such that the "blanks" between individual words assume a more natural size again.

Another type of compression/expansion can be referred to as "weight compression/expansion. Weight compression/expansion is applicable to the weights (e.g., widths) of the strokes and possibly the lengths and thicknesses of the serifs. Weight compression/expansion can be implemented to make vertical and horizontal (and diagonal) strokes thinner or thicker. When appropriate, parameters representing weight compression/expansion and positional compression/expansion can be combined to synthesize a font variant (e.g., to compress/expand stroke weight and compress/expand stroke positions independently. For example, parameters for synthesizing a font variant may indicate a positional expansion in x-direction of 7% along with a weight expansion in x-direction of 70%. Utilizing a combination of weight and positional compression/expansion to synthesize a font variant can result in better light/bold variants, as well as small caps or superiors (superscripts) and inferiors (subscripts).

It should be understood that the described font variations are examples. It would be apparent to one skilled in the art, after having reviewed this description, that other font variations, in addition to the described font variations, are possible.

When a font variant is to be rendered on a color display device, more precise external parameters can be utilized. For example, ClearType® processes directions perpendicular to the striping of pixel sub-components (e.g., vertical red, green, and blue stripes) at a higher precision, for example, 16 times the precision of bi-level processing. Thus, external parameters representing expansion, compression, and/or movement at a display device can be more accurately rendered. For example, a micro-justification may be an adjustment of as little as 1%. However using bi-level processing, 1% of an advance width of 10 pixels (corresponding to a glyph rendered at 10 point and 96 dpi) translates to 0.1 pixels), which when rounded results in an adjustment of 0 pixels. On the other hand, using ClearType®, 1% of 10 pixels essentially translates into 1% of 160 virtual pixels, or 1.6 virtual pixels, which when rounded results in 2 virtual sub-pixels.

As previously described, hints included in scaled font 121 and external parameters 123 can be font-hinting language instructions of the same font-hinting language. Accordingly, the method 200 includes an act of the computing system applying the one or more external font parameters to the scaled font to synthesize a font variant such that the hints from the scaled font are preserved in the font variant (act 203). For example, hint processor 122 can apply external parameters 123 to scaled font 121 to synthesize font variant 133 such that font variant 133 complies with standardized distances 102, reference heights 103, and hints in glyph set 104 (e.g., hints 108). Font variant 133 can be cached in storage 132 such that font variant 133 can be more efficiently accessed in response to subsequent application program commands. Storage 132 can be system memory or mass storage associated with computing system 116.

Hint processor 122 can also generate font variant outlines 126 corresponding to font variant 133. Scan conversion module 124 can receive font variant outlines 126.

The method 200 includes the computing system rendering glyphs of the font variant that comply with both the one or more external font parameters and the hints (act 204). For example, scan conversion module 124 can process font variant outlines 126 to render glyphs of font variant 133 that comply with standardized distances 102, reference heights 103, and hints in glyph set 104 (e.g., hints 108). Rendered glyphs can be included in pixelated representation 127 and sent to output device 128.

FIG. 3A illustrates a first example of font variants. FIG. 3A depicts glyphs of the Arial font at target size of 10 point and a target resolution of 96 dpi. Unaltered scaled font 306 depicts the glyphs without the application of external parameters. Expanded advance widths 301 depict expansions in width from 1% to 5%. Compressed advance widths 302 depict compression in width from 1% to 5%.

FIG. 3B illustrates a second example of font variants. FIG. 3B depicts glyphs of the Palatino font at a target size of 10 point and a target resolution of 96 dpi. Unaltered scaled font 308 depicts the glyphs without the application of external parameters. Expanded advance widths 303 depict expansions in width from 1% to 5%. Compressed advance widths 304 depict compression in width from 1% to 5%.

The external parameters used to implement the font compressions and font expansions in FIGS. 3A and 3B can be expressed in font-hint language instructions. The font-hint language instructions expressing the external parameters and the font-hinting language expressing hints for the fonts in FIGS. 3A and 3B can be of the same font-hinting language. For example, external parameters for expressing a 3% expansion can be expressed in the same font-hinting language used to express standardized distances and reference heights for the fonts in FIGS. 3A and 3B. The font variants depicted in FIGS. 3A and 3B can be appropriately represented on a color display device, for example, using ClearType® or other rendering mechanisms that individually address and vary the intensity at display sub-components.

Figure 4:
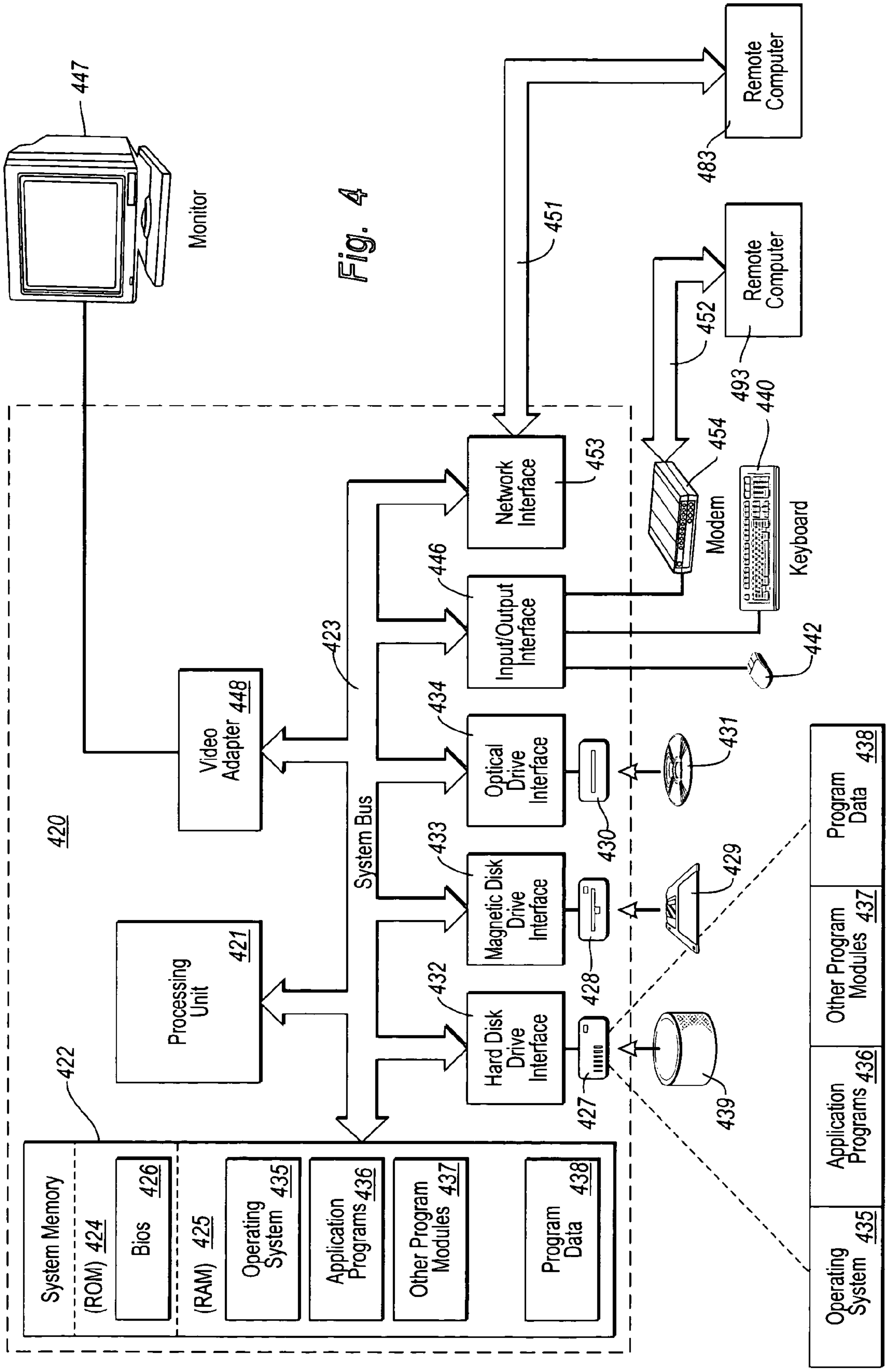
FIG. 4 illustrates a suitable operating environment for implementing the principles of the present invention.

FIG. 4 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer system 420, such as during start-up, may be stored in ROM 424. Storage 132 may be a portion of RAM 425.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide nonvolatile storage of computer-executable instructions, data structures, program modules, and other data for the computer system 420. Although the example environment described herein employs magnetic hard disk 439, removable magnetic disk 429 and removable optical disk 431, other types of computer-readable media for storing data can be used, including magnetic cassettes, flash memory cards, digital versatile disks, Bernoulli cartridges, RAMs, ROMs, and the like. Storage 132 may be a portion of one of the described types of computer-readable media.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of possible interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Monitor 447 can display monochrome and/or color graphical objects, including text, generated by computer system 420. Other peripheral devices (not shown), such as, for example, speakers, printers, and scanners, can also be connected to computer system 420. Printers connected to computer system 447 can print monochrome and/or color graphical objects, including text, generated by computer system 420.

Computer system 420 is connectable to networks, such as, for example, an office-wide or enterprise-wide computer network, a home network, an intranet, and/or the Internet. Computer system 420 can exchange data with external sources, such as, for example, remote computer systems, remote applications, and/or remote databases over such networks.

Computer system 420 includes network interface 453, through which computer system 420 receives data from external sources and/or transmits data to external sources. As depicted in FIG. 4, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a network (e.g., an Ethernet segment), and remote computer system 483 represents a node of the network.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem), through which computer system 420 receives data from and/or transmits data to external sources. As depicted in FIG. 4, input/output interface 446 and modem 454 facilitate the exchange of data with remote computer system 493 via link 452. Link 452 represents a portion of a network and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, modules, such as, for example, scaling module 119, hint processor 122, and scan conversion module 124, as well as associated program data, such as, for example, font file 101, scaled font 121, external parameters 123, font variant 133, and font variant outlines 126, can be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a networked environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computing system that has access to one or more fonts, each font including glyphs representing the corresponding characters of the font, a method for using externally parameterizeable constraints to synthesize a font variant, the method comprising:

accessing a font file comprising a plurality of glyphs and standard instructions for constraining each of the plurality of glyphs, each of the plurality of glyphs storing glyph features;

utilizing the font file in accessing a scaled font that has been scaled for rendering at a target size and a target resolution, the scaled font referencing hints that constrain how glyphs of the scaled font are to be rendered at the target size and target resolution, wherein the font file is fully internally constrained and includes hints sufficient to synthesize and render the scaled font;

receiving a request for a font variant of the scaled font which corresponds to the accessed font file;

determining by the computing system that the requested font variant is inaccessible;

accessing one or more external font parameters that alter how the glyphs of the scaled font are to be rendered;

applying the one or more external font parameters to the scaled font to synthesize the font variant such that the hints from the scaled font are preserved in the font variant; and render glyphs of the font valiant that comply with the one or more external font parameters and the preserved hints on a display device.

2. The method as recited in claim 1, wherein accessing a scaled font that has been scaled for rendering at a target size and a target resolution comprises accessing a scaled font that includes font-hinting language instructions.

3. The method as recited in claim 1, wherein accessing one or more external font parameters that alter how the glyphs of the scaled font are to be rendered comprises accessing a parameter that represents the glyphs of the scaled font are to be positionally compressed wherein the positional compression is in at least one of a vertical and horizontal direction.

4. The method as recited in claim 1, wherein accessing one or more external font parameters that alter how the glyphs of the scaled font are to be rendered comprises accessing a parameter that represents the glyphs of the scaled font are to be positionally expanded wherein the positional expansion is in at least one of a vertical and horizontal direction.

5. The method as recited in claim 1, wherein accessing one or more external font parameters that alter how the glyphs of the scaled font are to be rendered comprises accessing a parameter that represents the glyphs of the scaled font are to be weight compressed wherein the weight compression is in at least one of a vertical and horizontal direction.

6. The method as recited in claim 1, wherein accessing one or more external font parameters that alter how the glyphs of the scaled font are to be rendered comprises accessing a parameter that represents the glyphs of the scaled font are to be weight expanded wherein the weight expansion is in at least one of a vertical and horizontal direction.

7. The method as recited in claim 1, wherein accessing one or more external font parameters that alter how the glyphs of the scaled font are to be rendered comprises accessing a parameter that represents how the glyphs of the scaled font are to be offset wherein the offset is in at least one of a vertical or horizontal direction.

8. The method as recited in claim 1, wherein accessing one or more external font parameters that alter how the glyphs of the scaled font are to be rendered comprises accessing font-hinting language instructions.

9. The method as recited in claim 1, wherein applying the one or more external font parameters to the scaled font to synthesize a font variant such that the hints are preserved in the font variant comprises compressing the scaled font in at least one of a vertical and horizontal direction.

10. The method as recited in claim 1, wherein applying the one or more external font parameters to the scaled font to synthesize a font variant such that the hints are preserved in the font variant comprises expanding the scaled font in at least one of a vertical and horizontal direction.

11. The method as recited in claim 1, wherein applying the one or more external font parameters to the scaled font to synthesize a font variant such that the hints are preserved in the font variant comprises offsetting the scaled font in at least one of a vertical and horizontal direction.

12. The method as recited in claim 1, wherein applying the one or more external font parameters to the scaled font to synthesize a font variant such that the hints are preserved in the font variant comprises applying the one or more external font parameters to the scaled font to synthesize a font variant such that standardized distances and reference heights of the scaled font are preserved.

13. The method as recited in claim 1, wherein rendering glyphs of the font variant that comply with both the one or more external font parameters and the hints comprises rendering glyphs of the font variant that comply with the one or more external font parameters and standardized distances and reference heights.

14. The method as recited in claim 1, wherein rendering glyphs of the font variant that comply with both the one or more external font parameters and the hints comprises performing scan conversion on font variant outlines that comply with the one or more external font parameters and the hints.

15. The method as recited in claim 1, wherein rendering glyphs of the font variant that comply with both the one or more external font parameters and the hints comprises addressing and setting the intensity for individual sub-components of a display device so as to more accurately render the glyphs of the font variant.

16. The method as recited in claim 1, further comprising:

scaling the glyphs of a font file for rendering at the target size and target resolution.

17. The method as recited in claim 1, further comprising:

caching the font variant such that the font variant can be efficiently accessed in response to subsequent application program commands.

18. A computer program product for use in a computing system that has access to one or more fonts, each font including glyphs representing the corresponding characters of the font, the computer program product for implementing a method for using externally parameterizeable constraints to synthesize a font variant, the computer program product comprising one or more physical computer-readable media having stored thereon computer executable instructions that, when executed by a processor, cause the computing system to perform the following:

access a font file comprising a plurality of glyphs and standard instructions for constraining each of the plurality of glyphs, each of the plurality of glyphs storing glyph features;

utilize the font file to access a scaled font that has been scaled for rendering at a target size and a target resolution, the scaled font referencing hints that constrain how glyphs of the scaled font are to be rendered at the target size and target resolution, wherein the font file is fully internally constrained and includes hints sufficient to synthesize and render the scaled font;

receive a request for a font variant of the scaled font corresponding to the accessed font file;

determine that the requested font variant is inaccessible;

access one or more external font parameters that alter how the glyphs of the scaled font are to be rendered;

apply the one or more external font parameters to the scaled font to synthesize the font variant such that the hints are preserved in the font variant and render glyphs of the font variant that comply with the one or more external font parameters and the preserved hints on a display device.

19. A computing system, comprising:

one or more processors; and one or more physical computer-readable media, having stored thereon one or more fonts, each font including glyphs representing the corresponding characters of the font and having stored thereon a hint processor that can be executed by the one or more processors, the him processor being configured to:

access a font file comprising a plurality of glyphs and standard instructions for constraining each of the plurality of glyphs, each of the plurality of glyphs storing glyph features;

utilize the font file to access a scaled font that has been scaled for rendering at a target size and a target resolution, the scaled font referencing hints that constrain how glyphs of the scaled font are to be rendered at the target size and target resolution, wherein the font file is fully internally constrained and includes hints sufficient to synthesize and render the scaled font;

receive a request for a font variant of the scaled font corresponding to the accessed font file;

determine that the requested font variant is inaccessible;

access one or more external font parameters that alter how the glyphs of the scaled font are to be rendered;

apply the one or more external font parameters to the scaled font to synthesize the font variant such that the hints are preserved in the font variant and render glyphs of the font variant that comply with the one or more external font parameters and the preserved hints on a display device.

20. The method as recited in claim 1, further comprising determining that one or more gaps between the glyphs of the scaled font should be modified, and wherein applying the one or more external font parameters to the scaled font modifies the one or more gaps between the glyphs.

21. The method as recited in claim 20, wherein determining that one or more gaps between the glyphs should be modified is done in response to applying justification to the glyphs of the scaled font.

22. The method as recited in claim 1, wherein applying the one or more external font parameters uniformly alters how the glyphs of the scaled font are rendered.

23. The method as recited in claim 1, wherein accessing one or more external font parameters that alters how the glyphs of the scaled font are to be rendered comprises accessing at least one of a glyph expansion or compression percentage, and wherein applying the one or more external font parameters to the scaled font comprises applying the at least one glyph expansion or compression percentage to the scaled font to synthesize a font variant such that the hints are preserved in the font variant.

24. A method as recited in claim 1, wherein said one or more external font parameters include font-hinting instructions in the same language as the hints of the sealed font.

* * * * *